Sept. 21, 1954  A. GOULDING, JR., ET AL  2,689,372
APPARATUS FOR HEATING AND COOLING LAMINATES Filed Nov. 24, 1950  2 Sheets-Sheet 1

INVENTOR.
Albert Goulding, Jr.
John C. Bond
Harold W. Emrick, &
John W. Krosse
BY
H.H. Oldham
ATTORNEY INVENTOR.
Albert Goulding, Jr.
John C. Bond
BY Harold W. Emrick, &
John W. Krosse

ATTORNEY

Patented Sept. 21, 1954

2,689,372

UNITED STATES PATENT OFFICE 2,689,372

APPARATUS FOR HEATING AND COOLING LAMINATES

Albert Goulding, Jr., Cuyahoga Falls, John C. Bond, Akron, Harold W. Emrick, Barberton, and John W. Krosse, Doylestown, Ohio, assignors to Goodyear Aircraft Corporation, Akron, Ohio, a corporation of Delaware Application November 24, 1950, Serial No. 197,476

7 Claims. (Cl. 18—1)

This invention relates to apparatus for heating and cooling molds used for forming and curing thereon articles made of laminations of resin-impregnated fibrous material, such as glass fibre cloth, and in particular to apparatus which permit in fixed position rapid heating and cooling of the mold and article to increase production.

Heretofore it has been known to heat molds, together with the material formed thereon, in an oven for curing the molded article followed by outside air cooling and thereafter to remove the article from the mold. Although this method of heating and cooling produces satisfactory articles the time required for these process is too prolonged and, besides, repeated handling of the mold during such process is necessary.

It is the general object of the invention to avoid and overcome the foregoing and other difficulties of and objections to prior art practices by the provision of an apparatus supporting the mold and forcing hot and cold air thereagainst for heating and cooling it, respectively, while remaining in one and the same position.

Another object of the invention is to concentrate the heat applied to the mold only to the mold cavity closed by slides of insulating material to prevent heat dissipation to the greatest possible extent.

Another object of the invention is to eliminate an oven for heating and curing the laminate.

Another object of the invention is to decrease the heating and cooling time period resulting in increased production.

The foregoing objects of the invention, and other objects which will be made apparent as the specification proceeds, are achieved by an apparatus consisting of a table-like frame work on which rests the hollow mold for forming the article desired. Underneath the mold are provided sliding boards made of heat insulating material for closing the mold cavity in which, mounted on the frame work, is placed an electric heater through which air is forced by an electric motor driven fan. During the heating period only the air within the mold cavity is heated and moved by forced circulation until the laminate is fully cured. Then the insulating boards are removed and the fan sucks cold air through a duct raised to the height of a casing surrounding the fan so that the hot air in the mold is pushed out and is prevented from returning thereinto. With this arrangement the mold cools off in the shortest possible time and permits replacement of the cured article by a new set of uncured laminate. The temperature of the mold as well as of the electric heater is controlled by separate thermostats to prevent overheating of the mold as well as of the heater.

For a better understanding of the invention reference should be had to the accompanying drawings, wherein.

Figure 1:
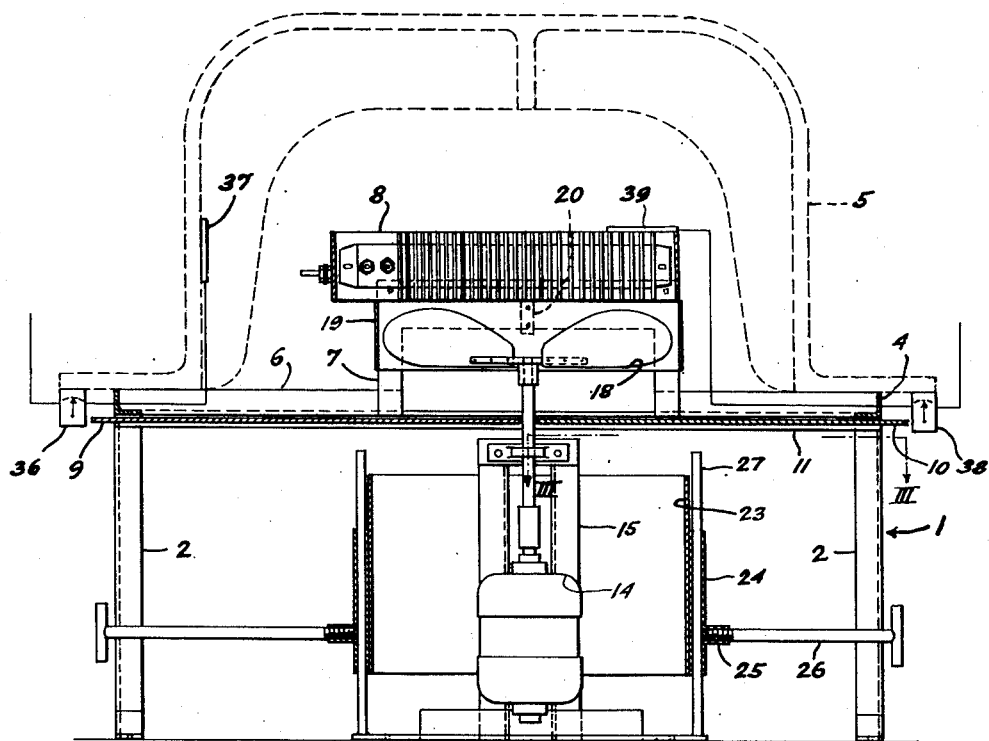
Fig. 1 is a cross-sectional vertical view of the apparatus, according to the invention, taken on line I—I of Fig. 3.

With specific reference to the form of the invention illustrated in the drawings, the numeral 1 indicates in general a mold support having legs 2, provided with bottom angles 3 for floor fastening, and a top frame 4, preferably welded to the legs 2, on which rests a hollow metal mold 5 for forming thereover laminated articles made of resin-impregnated fibrous material, such as glass fiber cloth. A pair of spaced transverse angles 6 with a center portion of the vertical flanges cut off for better air circulation connect to opposite sides of the frame 4, each angle 6 having welded thereto a support 7 to which is attached an electric heater 8 located well within the mold cavity. Removable heat insulating boards 9 and 10, resting on guides 11 which are separated by spacers 12 from and fastened by screws 13 to the bottom of frame 4, are provided for preventing air circulation between the mold cavity and the outside air when heating the mold. An electric motor 14 with its shaft in vertical position is mounted to a support 15 fastened to the floor to drive by a shaft 16 connected to the motor shaft by a coupling 17 the fan 18 surrounded by a cylindrical casing 19 which is fastened to with its upper edge adjacent the lower heater surface, and spaced from the supports 7 by distance pieces 20. A bearing 21 resting on a pad 22 at the upper end of motor support 15 holds the fan shaft 16 in proper alignment with the motor shaft.

Figure 2:
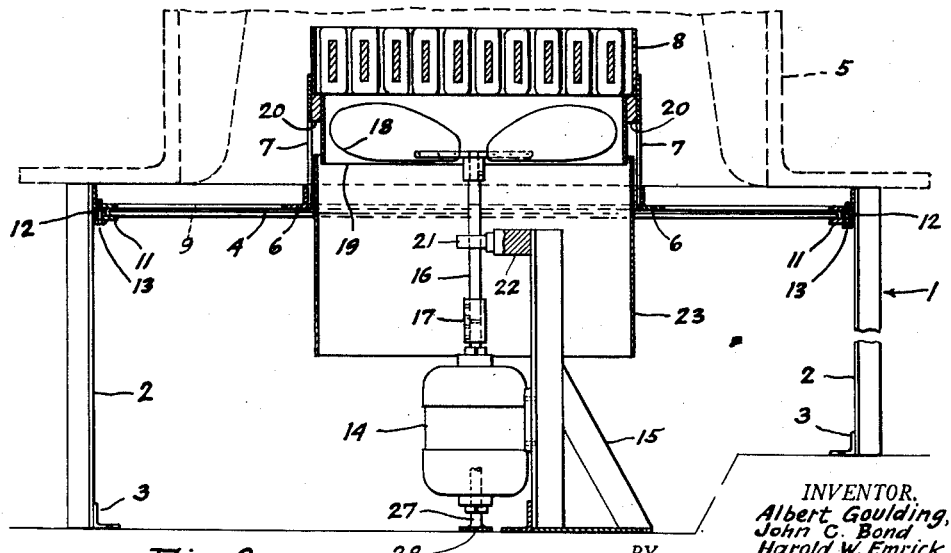
Fig. 2 is a cross-sectional vertical view taken on line II—II of Fig. 3.
Figure 3:
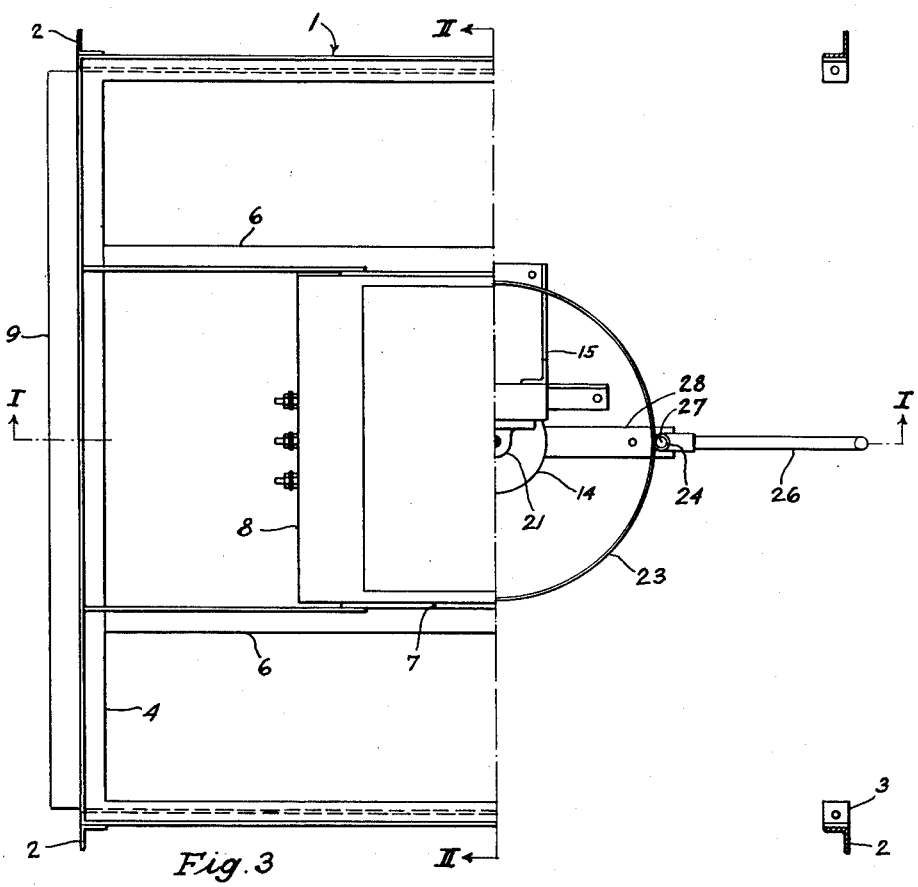
Fig. 3 is a top view, without the mold, showing one-half of the apparatus and the other half being a cross-section taken on line III—III of Fig. 1.

For supplying cold air for cooling the mold a vertical duct 23 is provided to which are attached diametrically opposite to the outside thereof a pair of vertical tubular guides 24 from which laterally extend threaded sockets 25 into which fit handle bars 26. The duct 23 is movable along vertical rods 27 fastened to a base 28 secured to the floor by any suitable means. In tightening the handle bars 26 against the rods 27 the duct 23 can be held vertically in any desired position. Before movement of the duct 23 to its upper or cooling position shown in Fig. 2, it is necessary to pull boards 9 and 10 back out of the way, as shown in Fig. 2, a sufficient distance to allow the cooling air to escape from the mold, or, if desired, the boards 9 and 10 can be completely removed from their guides 11. In its uppermost position the duct 23 extends somewhat above the bottom of the fan casing 19, Fig. 2, so that in cooling the mold hot air from the mold has little chance to mix with the cold air passing through the duct 23, thus making the cooling most effective.

Figure 4:
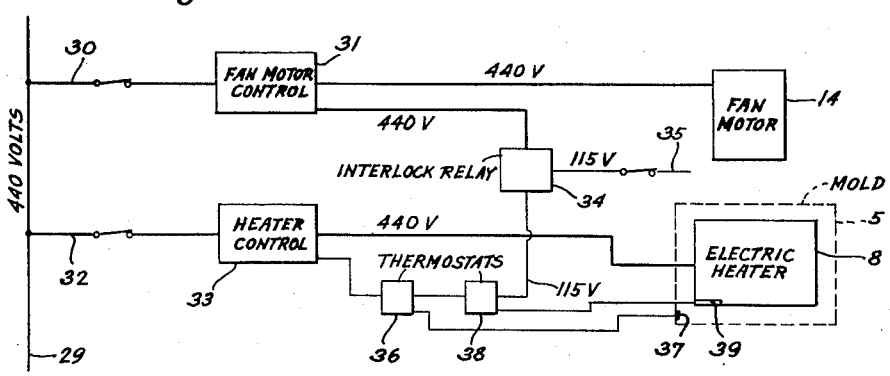
Fig. 4 is a diagram of the electrical arrangement for operating the apparatus.

For supplying the apparatus with electric power reference is made to the diagram, Fig. 4, showing in a simplified manner the general arrangement of its electric system which consists of a three phase, 440 volt, main power line 29 from which branch off to the motor 14 line 30, containing a fan motor control 31 including a manual starter and line 32, containing a heater control 33, to the heater 8. An interlock relay 34, energized by a 440 volt current from line 30, supplies from line 35 to a contactor coil of the heater control 33 a control current of 115 volts for closing the heater supply circuit 32. In the 115 volt line are inserted in series a temperature control thermostat 36 attached to the mold 5 and being connected to a thermostat bulb 37 and a safety control thermostat 38 attached to the heater 8 and being connected to a thermostat bulb 39. The mold thermostat controls the desired temperature of the mold, whereas the heater thermostat acts only as a safety device to prevent overheating of the heater. In either case of overheating the respective thermostat will shut off the control current supply and accordingly the heater current. Lamps in the control circuit may be provided to indicate when current flows therein.

In operating the apparatus, the mold, covered on the outside with resin-impregnated material to be cured, is heated for which purpose the heat insulating boards 9 and 10, as shown in Fig. 1, keep the cavity of the mold 5, containing the electric heater 8 and fan 18, closed so that when electric current is applied the greatest portion of the heat developed in the heater is absorbed by the mold walls. Because the air in the mold is completely enclosed the mold is uniformly heated in the shortest possible time by the forced air circulation produced by the fan. After the laminate has reached the required curing temperature it is kept at such temperature until curing has taken place. Then the heater 8 is turned off, the boards 9 and 10 are removed, the air duct 23 is raised into the position shown in Fig. 2, so that now cold air taken from near the floor is forced into the mold and warm air leaving the mold will escape sideways so that it does not readily mix therewith, whereby again the cooling time of the mold is kept at a minimum. After cooling, the finished laminated article is removed from the mold which then is ready for making the next article thereon. Thus an article can be formed, cured and cooled on the mold and removed therefrom without moving the mold, thereby saving labor and time and in addition a spacious and costly oven.

From the aforesaid it will be readily understood that the apparatus, according to the invention, is a great improvement over prior practices of heating and cooling the mold together with the article inasmuch as the mold remains stationary during the entire manufacturing process of an article. By heating only the air volume within the mold cavity closed by heat-insulating shutters the heat supplied passes with least dissipation through the metal mold into the laminate to be cured. Because of forced air circulation in the mold during the heating process and, in subsequent cooling, removal of the heated air from the open hot mold by cold air, taken from near the floor, forced thereinto mixing of the heated cooling air with oncoming fresh cooling air is greatly prevented so that rapid cooling of the mold and article is achieved, resulting in greater and cheaper production.

It will be recognized that the objects of the invention have been achieved by avoiding repeated handling of the mold necessary with oven-curing of the article, by concentrated forced hot air heating with least heat dissipation, and by rapid forced fresh air cooling of the mold by essentially avoiding mixing of the incoming cooling air with the heated cooling air leaving the mold, all factors resulting in a product requiring less labor and heat consumption at faster production.

While certain representative embodiments and details have been shown for the purpose of illustrating the invention, it will be apparent to those skilled in this art that various changes and modifications may be made therein without departing from the spirit or scope of the invention.

What we claim:

1. An apparatus for heating and cooling a hollow male mold open at one side such as used for forming thereon hollow articles made of layers of resin-impregnated fibrous material comprising a mold support provided with an open top frame removably receiving thereon a mold with its hollow side facing the frame and being therewith in substantially sealing contact, removable shutter means for closing the open space surrounded by the frame, heater means within said mold, a power driven circumferentially enclosed fan between said heater and said shutter means for circulating the air enclosed in said mold when the heat is on, an air duct concentric with said fan, and means for varying and fixing the vertical position of said duct relative said fan for supplying, in raised position when the shutter means are removed and the heat off, outside cooling air to the mold.

2. An apparatus for heating and cooling a hollow male mold open at one side such as used for forming thereon hollow articles made of layers of resin-impregnated fibrous material comprising a mold support having an open frame spaced from the floor and being in substantially sealing contact with the open side of the mold removably supported thereon, shutters made of heat insulating material slidingly mounted on the underside of the frame to shut off the open space surrounded by the frame, an electric resistance heater above and spaced from the frame, a support for the heater mounted on and above the frame and permitting ample air circulation between the walls of the mold and through the heater, an electric motor driven fan in association with a cylindrical enclosure between the heater and the shutters for forcing the air enclosed in the mold through the heater against the mold, a cooling air duct provided with vertically disposed guide means including transverse threaded sockets, handle bars fitting into said sockets for vertically moving the duct to a desired position, and fixed guide posts on which said guides are slidable and secured thereto by said handle bars, said duct being positioned below said shutters when the heater is energized and raised with its top substantially near the bottom of said fan enclosure when the heat is off and cooling air is supplied.

3. An apparatus for heating and cooling in one position a hollow mold open at one side for forming thereon articles made of layers of resin-impregnated fibrous material comprising a mold support having an open frame in substantially sealing contact with the edge of the open side of the mold which is removably supported thereon, movable shutters associated with said frame for closing the mold, heating means within the mold above and spaced from the frame, a power driven fan between the heating means and the shutters for forcing the enclosed heated air against the mold walls, a cylindrical fan enclosure, and a vertically movable duct adapted to be moved so that its upper edge is near the bottom of said enclosure for supplying outside air to the fan for cooling the mold when the shutters are open, and adapted to be moved to a position below the shutters so that they can be closed.

4. Apparatus for heating and cooling laminates including a stationary mechanism, a hollow mold for supporting a laminate, the hollow mold being removably positioned on the mechanism, the mechanism including a heater positioned inside the hollow of the mold, a fan positioned inside the hollow of the mold and adapted to circulate air over the heater and against the inside of the mold, a prime mover positioned outside the mold and connected to drive the fan, shutter means positioned between the mold and the prime mover and movable to and from closure position over the hollow of the mold, and air duct means positioned outside the shutter means when they are closed and movable into operative relation with the fan when the shutter means are open.

5. Apparatus for heating and cooling laminates including a stationary mechanism, a hollow mold for supporting a laminate, the hollow mold being removably positioned on the mechanism, the mechanism including a heater positioned inside the hollow of the mold, a fan positioned inside the hollow of the mold and adapted to circulate air over the heater and against the inside of the mold, a prime mover positioned outside the mold and connected to drive the fan, and shutter means positioned between the mold and the prime mover and movable to and from closure position over the hollow of the mold.

6. An apparatus for heating and cooling a hollow mold such as used for forming thereon a hollow article made of layers of resin-impregnated fibrous material, comprising a leg-supported table-like open frame, a hollow mold having an open flange-surrounded bottom placed upon the frame in substantially sealing contact therewith, a pair of spaced transverse members connected to and between opposite sides of the frame, an electric heater placed within the hollow of the mold and being supported well above the top of said frame, an electric motor with its shaft extending vertically and having a fan attached thereto being mounted underneath said heater, a cylindrical casing surrounding said fan and resting against the bottom of the heater, shutters slidably and removably mounted at the bottom of said frame for closing the mold interior against the outside when the heater is energized, and a vertically adjustable air duct associated with the frame for movement to and from a position below the shutters and with the shutters out of the way to and from a position substantially surrounding the fan, the duct in its upper position supplying cold air through the heater into the mold for cooling it.

7. An apparatus for heating and cooling a hollow mold such as used for forming thereon a hollow article made of layers of resin-impregnated fibrous material, comprising a table-like open frame, a hollow mold open at the bottom placed upon the frame in substantially sealing contact therewith, electric heating means placed within the hollow of said mold, shutter means for closing the hollow of the mold against the outside, a power driven circumferentially enclosed fan placed underneath said heater for circulating with closed shutter means heated air in the mold hollow, and a vertically adjustable duct for supplying in raised position, with the shutter means removed and power to the heater shut off, cooling air to the mold.

References Cited in the file of this patent

UNITED STATES PATENTS

| Number | Name | Date |
|---|---|---|
| 2,065,895 | Jandat | Dec. 29, 1936 |
| 2,473,589 | Johnson | June 21, 1949 |
| 2,493,439 | Braund | Jan. 3, 1950 |